United States Patent
Harada

(10) Patent No.: US 12,290,931 B2
(45) Date of Patent: May 6, 2025

(54) ROBOT CONTROLLER

(71) Applicant: FANUC CORPORATION, Yamanashi (JP)

(72) Inventor: Kunihiko Harada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 398 days.

(21) Appl. No.: 18/001,448

(22) PCT Filed: Jul. 27, 2021

(86) PCT No.: PCT/JP2021/027744
§ 371 (c)(1),
(2) Date: Dec. 9, 2022

(87) PCT Pub. No.: WO2022/025060
PCT Pub. Date: Feb. 3, 2022

(65) Prior Publication Data
US 2023/0234225 A1 Jul. 27, 2023

(30) Foreign Application Priority Data

Jul. 29, 2020 (JP) .................. 2020-127989

(51) Int. Cl.
*B25J 9/16* (2006.01)
*B25J 13/08* (2006.01)

(52) U.S. Cl.
CPC ............. *B25J 9/1653* (2013.01); *B25J 9/163* (2013.01); *B25J 9/1692* (2013.01); *B25J 13/088* (2013.01); *B25J 9/1633* (2013.01)

(58) Field of Classification Search
CPC ........ B25J 9/163; B25J 13/088; B25J 9/1653; B25J 9/1633; B25J 9/1692
See application file for complete search history.

(56) References Cited

FOREIGN PATENT DOCUMENTS

| JP | H06-31665 A | 2/1994 |
| JP | H08-141950 A | 6/1996 |
| JP | 2020-040165 A | 3/2020 |

OTHER PUBLICATIONS

International Search Report issued in PCT/JP2021/027744; mailed Oct. 19, 2021.

*Primary Examiner* — Jaime Figueroa
*Assistant Examiner* — Zachary Joseph Wallace
(74) *Attorney, Agent, or Firm* — Studebaker Brackett PLLC

(57) ABSTRACT

According to the present invention, provided is a robot control device that can improve relatively easily the positioning accuracy of a robot. A robot control device according to one aspect of the present disclosure comprises: a position information acquisition unit which acquires position information indicating the actual position of a reference point at the end of a robot having a plurality of drive shafts; a parameter storage unit which stores a plurality of error parameters used to calculate the accurate position of the reference point from a command value for the robot; a sensitivity calculation unit which calculates a sensitivity value representing the magnitude of the change amount of the calculated position of the reference point with respect to the change amount for each error parameter; a target selection unit which selects, on the basis of the sensitivity value, an error parameter to be corrected by the parameter correction unit; and a parameter correction unit which corrects the error parameter to be corrected on the basis of the command value for the robot and the position information, assuming that error parameters other than the error parameter to be corrected do not affect the position of the reference point.

7 Claims, 3 Drawing Sheets

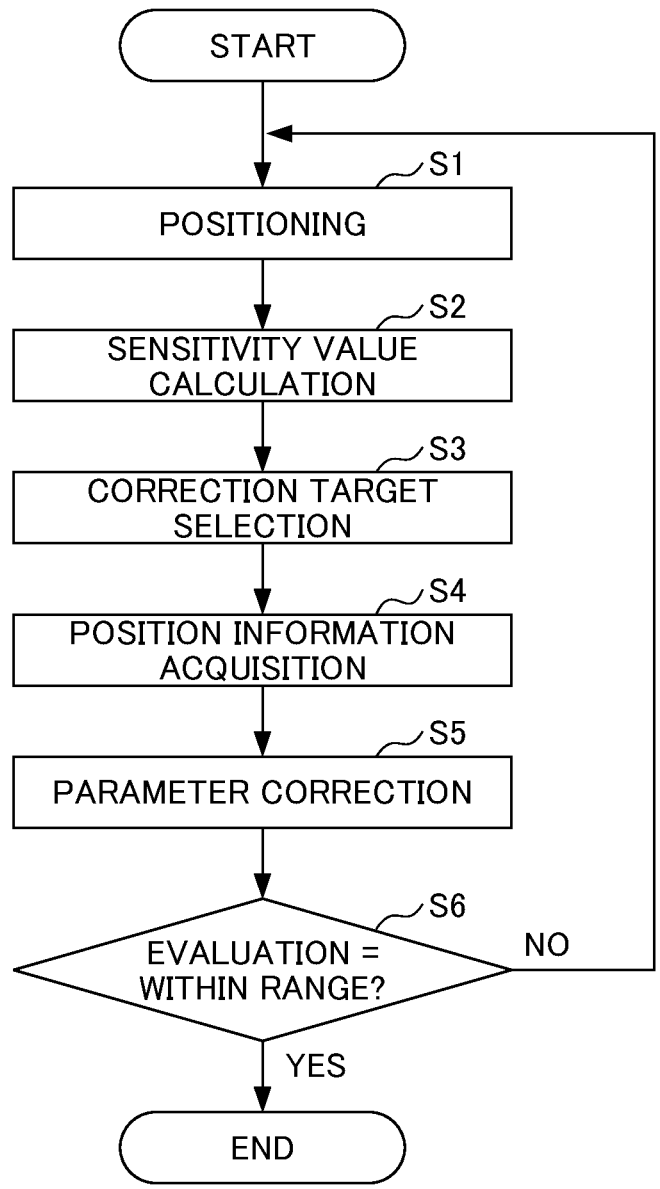

ROBOT CONTROLLER

TECHNICAL FIELD

The present invention relates to a robot controller.

BACKGROUND ART

In an articulated robot having a plurality of drive axes, the position of a reference point at a distal end of the robot is calculated based on the distance between the drive axes (link length) and the angular positions of the drive axes. However, in an actual robot, various factors can cause an error between a position of the reference point calculated from angle command values for the drive axes and a position of the reference point actually positioned. It has been therefore contemplated to compensate for an error between a theoretical position of the reference point corresponding to the command values for the robot and an actual position of the reference point, using a plurality of error parameters.

An articulated robot has a large number of error factors. Setting error parameters for each of the error factors therefore requires a significant number of error parameters. Furthermore, the error parameters do not work independently from one another, but are interrelated to affect the final positioning error. If all of the large number of error parameters are unknown variables, the values of the error parameters cannot be calculated without actually measuring positioning errors for an extremely large number of poses of the robot. To address this, it has been proposed to repeat a process including calculating error parameters based on relatively little information by selecting a group of error parameters from among a plurality of preset parameter groups out of a large number of error parameters, and evaluating whether or not the calculated error parameters are appropriate based on an actual positioning error (see, for example, Patent Document 1).

Patent Document 1: Japanese Unexamined Patent Application, Publication No. 2020-40165

DISCLOSURE OF THE INVENTION

Problems to be Solved by the Invention

In the method disclosed in Patent Document 1, the suitability of the preset parameter groups greatly affects the accuracy of the calculated error parameters. Error parameters that make a significant contribution to achieving accurate calculation of the position of the reference point vary depending on how the robot is used. It is therefore not easy to preset parameter groups to be preferentially corrected for.

Thus, there is a demand for a technology that makes it possible to increase the positioning accuracy of a robot more easily.

Means for Solving the Problems

A robot controller according to an aspect of the present disclosure includes: a position information acquisition unit configured to acquire position information indicating an actual position of a reference point at a distal end of a robot having a plurality of drive axes; a parameter storage unit configured to store therein a plurality of error parameters to be used to calculate an exact position of the reference point from command values for the robot; a sensitivity calculation unit configured to calculate, for each of the error parameters, a sensitivity value that represents magnitude of a change in a calculatory position of the reference point with respect to a change in the error parameter; a target selection unit configured to select, based on the sensitivity values, correction target error parameters to be subjected to correction from among the plurality of error parameters; and a parameter correction unit configured to correct for the correction target error parameters based on the command values for the robot and the position information, on an assumption that the error parameters other than the correction target error parameters have no impact on the position of the reference point.

Effects of the Invention

A robot controller according to the present disclosure makes it possible to increase the positioning accuracy of a robot relatively easily.

BRIEF DESCRIPTION OF THE DRAWINGS

FIG. 3 is a flowchart showing procedures of error parameter correction in the robot controller in FIG. 1.

PREFERRED MODE FOR CARRYING OUT THE INVENTION

Figure 1:
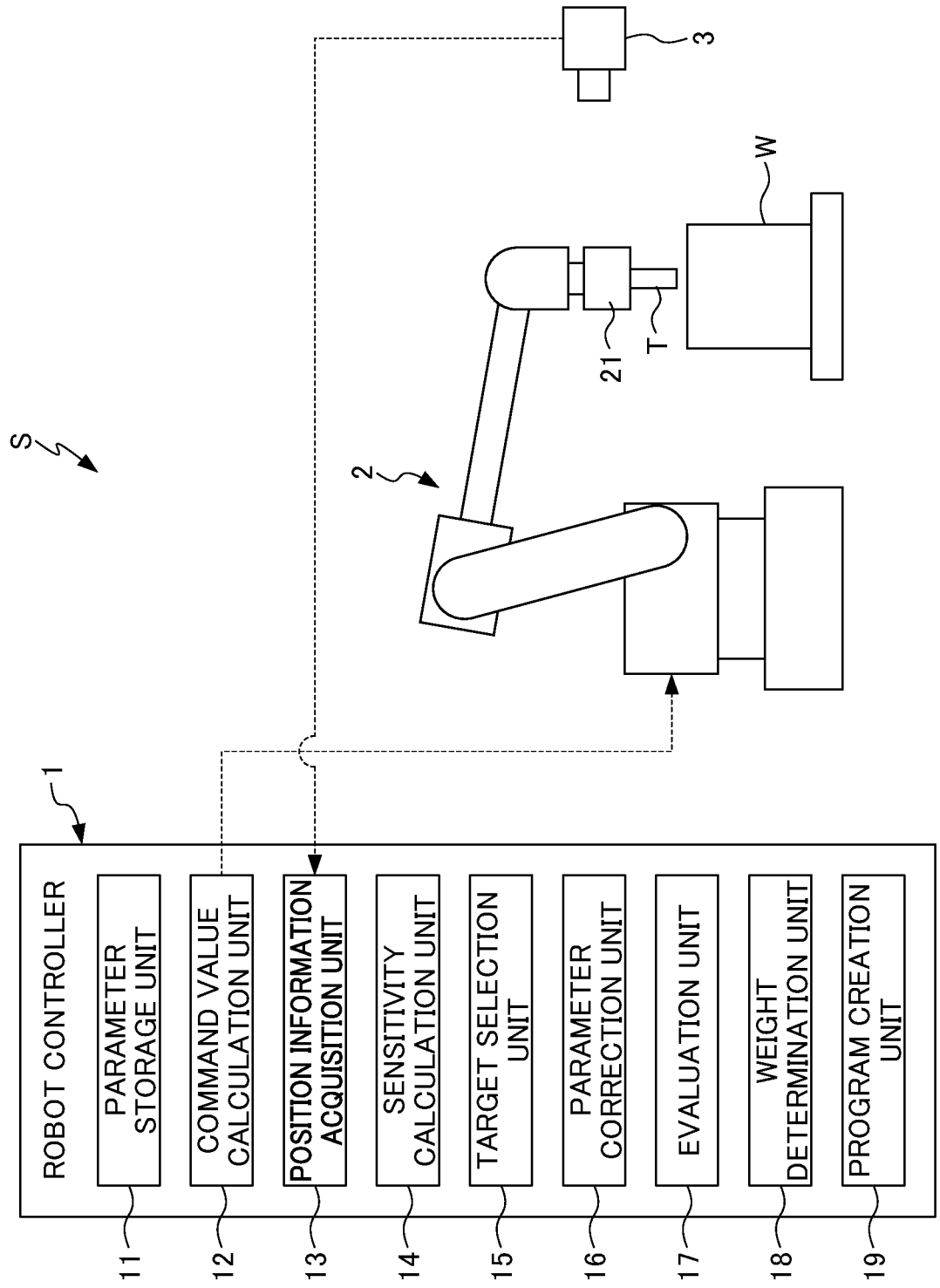
FIG. 1 is a diagram illustrating a configuration of a robot system including a robot controller according to the present disclosure.

The following describes an embodiment of the present disclosure with reference to the drawings. FIG. 1 is a diagram illustrating a configuration of a robot system S including a robot controller 1 according to the present disclosure.

The robot system S machines a workpiece W using a robot 2 that operates in accordance with control of the robot controller 1. The robot system S includes the robot controller 1, the robot 2 that is controlled by the robot controller 1, and a three-dimensional measurement device 3 that measures the three-dimensional position of a reference point at a distal end of the robot 2. The robot 2 has a plurality of drive axes. A machining head 21 that holds a tool T is disposed at the distal end of the robot 2.

The robot controller 1 includes a parameter storage unit 11, a command value calculation unit 12, a position information acquisition unit 13, a sensitivity calculation unit 14, a target selection unit 15, a parameter correction unit 16, an evaluation unit 17, a weight determination unit 18, and a program creation unit 19.

The robot controller 1 may be implemented by introducing an appropriate control program into a computer device having, for example, a CPU and memory. The elements of configuration mentioned above are separated in terms of functions of the robot controller 1, but do not have to be clearly distinguishable from one another by function or program structure.

The parameter storage unit 11 stores therein a plurality of error parameters to be used to calculate an exact position of the reference point of the robot 2 from command values for directing a desired position or speed of each of the drive axes of the robot 2. The error parameters are set to compensate for the difference between a theoretically calculated position (theoretical position) of the reference point and an actually measured position (actual position) of the reference point. The theoretical position is calculated based on, for example, the angle of each drive axis of the robot 2 and the distance between the drive axes. The actual position results from any mechanical error of the robot 2.

Figure 2:
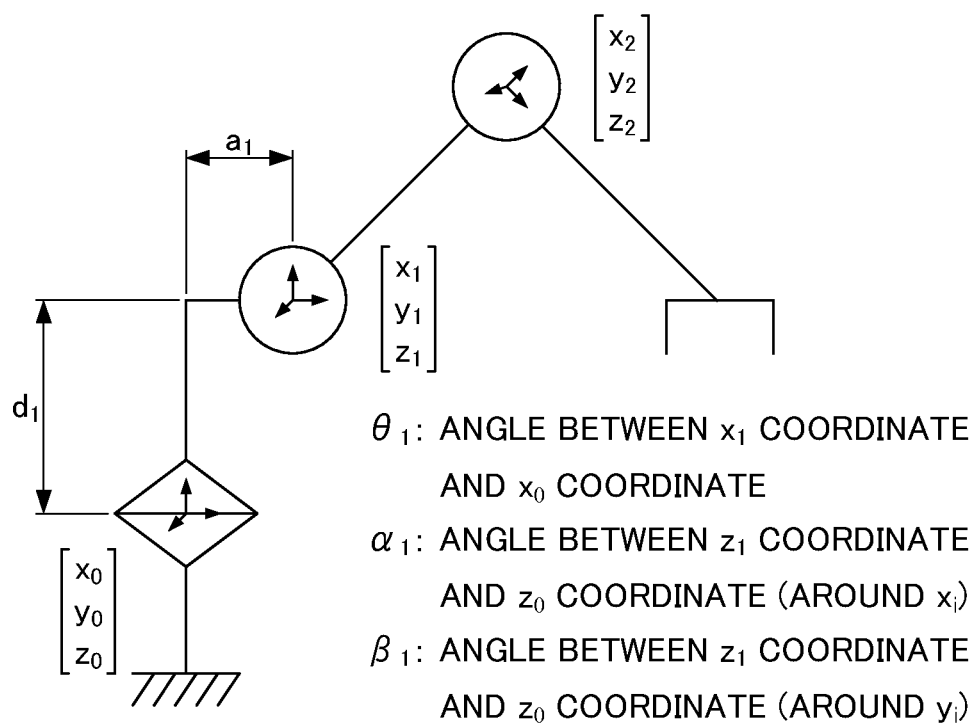
FIG. 2 is a diagram illustrating a model for explaining the relationship between positions of drive axes of a robot and poses of a reference point.

The theoretical position of the reference point is calculated through forward kinematics of the robot. It is well known to calculate the theoretical position using the Denavit-Hartenberg parameters (D-H parameters) for specifying relative relationships between adjacent joint axes. In an example shown in FIG. 2, a position $(x_i, y_i, z_i)$ of an $x_i$ axis with respect to an $x_{i-1}$ axis is calculated by causing a θ rotation around a $z_{i-1}$ axis first, and then a d translation along the $z_{i-1}$ axis, and then a translation along the $x_{i-1}$ after the rotation, and then an a rotation around the $x_i$ axis, and then a β rotation around a $y_i$ axis, thereby determining the position of the $x_i$ axis. The meanings of θ, d, a, α, and β mentioned above are as follows, and each value is given as a design value of the robot.

θ: Angle of rotation from the $x_{i-1}$ axis to the $x_i$ axis (around the axis)

d: Distance from the origin of the i−1 coordinate system to the intersection of the $z_{i-1}$ axis and the $x_{i-1}$ axis a: Distance from the intersection of the $z_{i-1}$ axis and the $x_n$ axis to the origin of the i coordinate system α: Angle of rotation from the $z_{i-1}$ axis to the $z_i$ axis (around the $x_i$ axis)

Angle of rotation from the $z_{i-1}$ axis to the $z_i$ axis (around the $y_i$ axis)

However, there are errors between the design values and the actual robot, and five error parameters are necessary for the five design values described above.

θ is the amount of rotation with respect to an encoder output for driving each axis, and a reference position thereof is a correction factor. Ultimately, for a six-axis articulated robot, 6 axes×5=30 error parameters are necessary to correct for the DH parameters.

Furthermore, to correct for deflection of each axis with respect to gravitational torque of the axis about the x, y, and z axes, each axis has three spring constants as error parameters, and (gravitational torque x spring constant) is added to θ, α, and β described above as a correction amount.

Furthermore, the amount of rotation with respect to the encoder output for driving each axis may have a ratio (a) of the amount of rotation (y) to the encoder output (x) as an error parameter (y=ax), or may have a plurality of angular transmission-related error parameters obtained by formulating the relationship between the encoder output and the amount of rotation as an angular transmission error model (y=ax+bcos (x)), and the error parameters may be added to θ, α, and β described above for correction.

The command value calculation unit 12 calculates command values for directing a desired position or speed of each of the drive axes of the robot 2 in order to move the tool T along a predetermined path to machine the workpiece W in accordance with a program. That is, the command value calculation unit 12 calculates command values such that the position calculated using the error parameters stored in the parameter storage unit 11 is the position requested by the program.

The position information acquisition unit 13 acquires position information indicating a position measured (measured position) as the actual position of the reference point at the distal end of the robot 2. Typically, the position information acquisition unit 13 can acquire the position information from the three-dimensional measurement device 3. Additionally or alternatively, the position information acquisition unit 13 may acquire the position information through a calculation based on an operator's right position teaching action. Specifically, the position information acquisition unit 13 may calculate, as the measured position, a position of the reference point based on a calculatory position (calculated position) of the reference point, which is calculated from the command values using the error parameters, and an amount by which the operator has moved the reference point from the position of the reference point positioned in accordance with the command values.

The sensitivity calculation unit 14 calculates, for each of the error parameters, a sensitivity value that represents the magnitude (sensitivity) of a change in the calculatory position of the reference point with respect to a change in the error parameter. The sensitivity values may be independent evaluation scores, rankings, or rank values of grouped sensitivities.

A vector p, which represents the three-dimensional position of a tip end of the robot, can be represented as follows using a function f that takes into account the above-described error model, where q is a vector having the above-described error parameters as elements thereof.

$$P=f(q)$$

A vector Δp, which represents the amount of an offset between the commanded position and the measured position of the tip end of the robot, can be approximated by a sum of linear combinations of minute variations in each error parameter. Note that JA is a Jacobean.

$$\Delta p=(\partial p/\partial q)\cdot\Delta q=JA\cdot\Delta q$$

A laser tracker affords three-dimensional measurement, and thus three equations are produced from a single measured pose. Applying the foregoing to a plurality of measured poses yields a Jacobian D and a vector Δr representing the amount of an offset corresponding to each pose, which is represented as follows.

$$\Delta r=D\cdot\Delta q$$

Generally, error parameters are identified by solving an iterative estimation problem for minimizing Δr.

Jacobian D is given as follows, where N is the number of equations, and M is the number of error parameters.

$$[D] = \begin{bmatrix} D11 & D12 & \ldots & D1m \\ D21 & D22 & \ldots & D2m \\ \vdots & \vdots & \ddots & \vdots \\ Dn1 & Dn2 & \ldots & Dnm \end{bmatrix} \quad \text{[Formula 1]}$$

Each element of D represents the amount of an offset of the position of the tip end in the n-th measurement among measurements with an error parameter minutely varied. The column vectors of D are sensitivity vectors corresponding to respective error parameters. The greatest absolute value of the elements, (greatest absolute value—smallest absolute value), or the vector magnitude of each of the sensitivity vectors may be used as a sensitivity indicator. In a case where a spring of a J1 axis around the Z axis is an error parameter corresponding to the first column, for example, the greatest absolute value, (greatest absolute value—smallest absolute value), or the vector magnitude of the first column is significantly small compared to those of the other columns, as long as change in Z-axis torque of the J1 axis is significantly small in each measured pose. The error parameter in this case is excluded from the error parameter group.

In a situation in which the number of equations is greater than the number of unknowns, a generalized least—squares problem can be solved by transforming [D]{p}={q} to [D]$^T$[D]{p}=[D]$^T${q} and obtaining the following formula.

$$[D]^T[D] = \begin{bmatrix} D11 & D12 & \ldots & D1m \\ D21 & D22 & \ldots & D2m \\ \vdots & \vdots & \ddots & \vdots \\ Dm1 & Dm2 & \ldots & Dmm \end{bmatrix} \quad \text{[Formula 2]}$$

[D]$^T$[D] is an M×M matrix. These column vectors may be defined as sensitivity vectors and adapted into indicators.

Furthermore, calculating inner products between the column vectors of [D]$^T$[D] allows for determination of dependence between error parameters. In a case where a spring of the J1 axis around the Z axis is corresponding to the first error parameter, and the second error parameter is related to the ratio between the encoder value and the angle of rotation of the J1 axis, for example, the inner product between the first and second column vectors is calculated to be 1, as long as change in the encoder value and change in the torque of the J1 axis about the Z axis are proportional to each other in each measured pose. It is preferable that the error parameter in this case be excluded from the error parameter group, too.

Alternatively, any error parameters in [D]$^T$[D] whose eigenvalues are so small that the ratio between the greatest eigenvalue and the smallest eigenvalue is less than or equal to a specific value may be excluded from the error parameter group.

Jacobian D can be calculated before the position information is obtained through the measurement. It is therefore possible to gain, before the measurement is started, prior knowledge as to which error parameters are to be calculated. In a situation in which the number of error parameters that can be calculated is significantly small, for example, the accuracy expected to be achieved is likely to be low. The aforementioned prior knowledge makes it possible in such a situation to consider in advance increasing the number of poses to be measured.

The target selection unit 15 selects, based on the sensitivity values calculated by the sensitivity calculation unit 14, error parameters to be calculated by the parameter correction unit 16. The target selection unit 15 may select a specific number of error parameters in higher sensitivity value rankings or may select error parameters having a sensitivity greater than or equal to a specific value. The target selection unit 15 may also increase or decrease the number of error parameters to be selected, depending on the number of pieces of position information to be obtained based on, for example, a machining program.

The target selection unit 15 may select error parameters to be calculated, based on weights set for the respective error parameters and the sensitivity values calculated by the sensitivity calculation unit 14. Weighting the sensitivity values calculated by the sensitivity calculation unit 14 helps select appropriate error parameters more quickly, with a higher correction priority given to error parameters expected to have a greater impact in terms of the structure of the robot 2 as well as to error parameters having a greater impact at the time of the acquisition of the position information.

The parameter correction unit 16 corrects for the error parameters based on the command values outputted from the command value calculation unit 12 to the robot 2 and the position information acquired by the position information acquisition unit 13. The parameter correction unit 16 corrects only for correction target error parameters selected by the target selection unit 15, on an assumption that the error parameters other than the correction target error parameters have no impact on the position of the reference point of the robot 2.

In actuality, the robot 2 has a very complex mechanism. In order to reflect all error factors, therefore, it is necessary to use an extremely large number of error parameters. Since various factors, such as the structure of the machining head 21 and motion patterns of the robot 2, affect the positioning error to be caused, appropriate values of the error parameters can vary depending on, for example, the mode of machining or the configuration of the machining program. In order to calculate right values for all of the error parameters, therefore, it is necessary to cause the robot 2 to make positioning motions with various motion patterns and acquire a large number of pieces of position information. In an example in which the robot 2 is a six-axis articulated robot, the number of combinations of necessary command values and position information exceeds 100.

The parameter correction unit 16 therefore analyzes the relationship between the command values and the actually measured position (actual position) of the reference point by assuming that only the error parameters selected by the target selection unit 15 are unknown variables to be calculated and the other error parameters are invariant (constant at the respective current values). Based on this analysis, the parameter correction unit 16 corrects for the values of the error parameters selected by the target selection unit 15 so that the actual position of the reference point can be calculated from the command values more accurately. This configuration makes it possible to yield, from a relatively small number of pieces of position information, a set of error parameters that are not necessarily exact but are effective enough to identify the position of the reference point of the robot 2 relatively accurately.

In the robot controller 1, the sensitivity calculation unit 14, the target selection unit 15, and the parameter correction unit 16 may perform their respective operations each time the position information is acquired. That is, each time the position information acquisition unit 13 acquires the position information, the sensitivity calculation unit 14 may recalculate the sensitivity values, the target selection unit 15 may re-select correction target error parameters, and the parameter correction unit 16 may correct for the error parameters. This configuration makes it possible to correct for the error parameters in stages to ensure that the error parameters are appropriate.

The evaluation unit 17 determines whether or not an offset between the position of the reference point calculated from the command values outputted from the command value calculation unit 12 to the robot 2 and the position of the reference point indicated by the position information acquired by the position information acquisition unit 13 is within a predetermined range. If the evaluation unit 17 determines that the offset between the position of the reference point calculated from a FIG. 1 position of the reference point of the robot 2 and the actually measured position of the reference point is within the predetermined range, the iterative processing for correcting for the error parameters in stages is stopped, so that the time required to obtain a set of effective error parameters can be reduced. The error parameter correction may be, for example, resumed when a predetermined event occurs, such as when the operation of the robot system S is stopped, when the machining program is changed, or when an emergency stop occurs.

The weight determination unit 18 determines weights depending on what has been done in a maintenance operation performed on the robot 2. The weight determination unit 18 may be therefore configured to receive an operator's input of what has been done in a maintenance operation. For example, in a case where a motor has been replaced, error factors related to the replaced motor can change, which can result in the need to significantly modify related error parameters. Thus, the weight determination unit 18 assigns a higher weight to the sensitivity values of error parameters that are likely to need modification because of the maintenance operation, making it possible to quickly compensate for any positioning error resulting from the maintenance operation. The weights of the sensitivity values of error parameters may be held each time measurement data is obtained and switched between before and after the maintenance operation to calculate mechanism error parameters of the robot after the maintenance operation using the measurement data obtained before and after the maintenance operation.

The program creation unit 19 creates a calibration program by adding, to the machining program for performing machining using the robot 2, an instruction for causing the position information acquisition unit 13 to acquire the position information. That is, the robot system S can calculate the error parameters while performing machining in accordance with the calibration program. Thus, the correction target error parameters are selected based on sensitive values determined during an actual machining operation. It is therefore possible to reliably increase the positioning accuracy, thus increasing the machining accuracy.

Typically, the robot 2 is a vertical articulated robot, but may be another type of robot such as a SCARA robot, a parallel-link robot, or a Cartesian coordinate robot. The robot 2 may have, at the distal end thereof, a marker that can be recognized by the three-dimensional measurement device 3.

The machining head 21 of the robot 2 may hold the tool T, which for example is a rotary cutting tool, and have a drive mechanism that drives (for example, rotates) the tool T. The machining head 21 may be, for example, a laser machining head.

Examples of devices usable as the three-dimensional measurement device 3 include a device that measures the three-dimensional shape of a surface of an object using, for example, a laser.

FIG. 3 shows procedures of the error parameter correction by the robot controller 1. The error parameter correction is implemented by a method including a positioning step (Step S1), a sensitivity value calculation step (Step S4), a correction target selection step (Step S5), a position information acquisition step (Step S2), a parameter correction step (Step S6), and an evaluation step (Step S3).

In the positioning step, which is Step S1, the command value calculation unit 12 calculates command values for positioning the robot 2 in accordance with a calibration program created by the program creation unit 19.

In the sensitivity value calculation step, which is Step S2, the sensitivity calculation unit 14 calculates sensitivity values respectively for all error parameters based on the command values and position information.

In the correction target selection step, which is Step S3, the target selection unit 15 selects, as correction target error parameters, error parameters in higher sensitivity value rankings.

In the position information acquisition step, which is Step S4, the position information acquisition unit 13 acquires position information of the reference point of the robot 2. In other words, the position information acquisition unit 13 measures the three-dimensional position of the reference point.

In the parameter correction step, which is Step S5, the parameter correction unit 16 corrects for the error parameters selected in the correction target selection step so that the calculated position is closer to the actually measured position. In other words, the parameter correction unit 16 modifies the values of the error parameters stored in the parameter storage unit 11.

In the evaluation step, which is Step S6, the evaluation unit 17 evaluates whether or not an offset between the calculated position of the reference point of the robot 2, which is calculated using the error parameters currently stored in the parameter storage unit 11 based on the command values calculated by the command value calculation unit 12, and the actually measured position of the reference point, which is indicated by the position information acquired by the position information acquisition unit 13, is within the predetermined range. If the offset between the calculated position and the actually measured position is within the predetermined range, the error parameters stored in the parameter storage unit 11 are considered appropriate, and the processing is ended. If the offset between the calculated position and the actually measured position is not within the predetermined range, the processing returns to Step S1, and the above-described steps are repeated. Returning to Step S1, the error parameter correction is re-performed with new position information acquired. Thus, the error parameters can be modified to more appropriate values, and the positioning accuracy of the robot can be progressively increased.

As described above, since the robot controller 1 uses, as correction target error parameters, only a small number of error parameters selected by the target selection unit 15, the robot controller 1 can obtain relatively accurate error parameters using a relatively small number of pieces of position information. That is, the robot controller 1 can increase the positioning accuracy of the robot 2 relatively easily.

While an embodiment of the robot controller according to the present disclosure has been described above, the scope of the present disclosure is not limited to the foregoing embodiment. The aforementioned effects of the foregoing embodiment are merely a list of the most preferable effects resulting from the robot controller according to the present disclosure. Effects that are produced by the robot controller according to the present disclosure are not limited to the aforementioned effects of the foregoing embodiment.

In the robot controller according to the present disclosure, the evaluation unit, the weight determination unit, and the program creation unit are optional elements of configuration, and thus may be omitted.

The robot controller according to the present disclosure is not limited to controlling a robot that has a machining head, and is also applicable to, for example, a robot that handles workpieces.

EXPLANATION OF REFERENCE NUMERALS

1: Robot controller
11: Parameter storage unit
12: Command value calculation unit
13: Position information acquisition unit
14: Sensitivity calculation unit
15: Target selection unit
16: Parameter correction unit
17: Evaluation unit 18: Weight determination unit
19: Program creation unit
2: Robot
21: Machining head
3: Three-dimensional measurement device
S: Robot system
T: Tool
W: Workpiece

The invention claimed is:

1. A robot controller comprising:
a position information acquisition unit configured to acquire position information indicating an actual position of a reference point at a distal end of a robot having a plurality of drive axes;
a parameter storage unit configured to store therein a plurality of error parameters to be used to calculate an exact position of the reference point from command values for the robot;
a sensitivity calculation unit configured to calculate, for each of the error parameters, a sensitivity value that represents magnitude of a change in a calculatory position of the reference point with respect to a change in the error parameter;
a target selection unit configured to select, based on the sensitivity values, correction target error parameters from among the plurality of error parameters; and
a parameter correction unit configured to correct for the correction target error parameters based on the command values for the robot and the position information, on an assumption that the error parameters other than the correction target error parameters have no impact on the position of the reference point.

2. The robot controller according to claim 1, further comprising an evaluation unit configured to determine whether or not an offset between the position of the reference point calculated using the error parameters and the position of the reference point indicated by the position information is within a predetermined range, wherein the sensitivity calculation unit, the target selection unit, and the parameter correction unit perform their respective operations each time the position information is acquired.

3. The robot controller according to claim 1, further comprising an evaluation unit configured to determine whether or not an offset between the position of the reference point calculated from the command values and the position of the reference point indicated by the position information is within a predetermined range, wherein
the sensitivity calculation unit, the target selection unit, and the parameter correction unit perform their respective operations each time the position information is acquired, and stop their respective processing if the evaluation unit determines that the offset is within the predetermined range.

4. The robot controller according to claim 1, wherein the position information acquisition unit calculates the actual position of the reference point based on the position of the reference point calculated from the command values and an amount by which an operator has moved the reference point from the position of the reference point positioned in accordance with the command values.

5. The robot controller according to claim 1, further comprising a program creation unit configured to create a calibration program by adding, to a machining program for performing machining using the robot, an instruction for causing the position information acquisition unit to acquire the position information, wherein
the error parameters are calculated while the machining is performed in accordance with the calibration program.

6. The robot controller according to claim 1, wherein the target selection unit ranks the error parameters based on the sensitivity values and weights set for the respective error parameters.

7. The robot controller according to claim 6, further comprising a weight determination unit configured to determine the weights depending on what has been done in a maintenance operation performed on the robot.

* * * * *